United States Patent
Thompson et al.

(10) Patent No.: US 12,432,168 B1
(45) Date of Patent: Sep. 30, 2025

(54) TIMEOUT PROCESSING FOR AGGREGATION MESSAGING IN AN INTEGRATION ENVIRONMENT

(71) Applicant: INTERNATIONAL BUSINESS MACHINES CORPORATION, Armonk, NY (US)

(72) Inventors: Benjamin Graham Thompson, Eastleigh (GB); John Anthony Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/613,555

(22) Filed: Mar. 22, 2024

(51) Int. Cl.
G06F 15/16 (2006.01)
H04L 47/50 (2022.01)
H04L 51/21 (2022.01)

(52) U.S. Cl.
CPC .............. H04L 51/21 (2022.05); H04L 47/50 (2013.01)

(58) Field of Classification Search
CPC ................................ H04L 51/21; H04L 47/50
USPC ........................................................ 709/206
See application file for complete search history.

(56) References Cited

U.S. PATENT DOCUMENTS

| | | | | |
|---|---|---|---|---|
| 5,953,316 A * | 9/1999 | Lazar | ................ | H04Q 11/0478 719/315 |
| 6,615,042 B1 * | 9/2003 | Britt | ................ | H04Q 3/0029 455/433 |
| 7,783,758 B1 * | 8/2010 | Jeyaraman | .............. | H04L 67/34 709/227 |
| 7,996,513 B2 * | 8/2011 | Gorman | .............. | G06F 11/3495 709/224 |
| 8,380,820 B1 * | 2/2013 | Kumarjiguda | ........ | H04L 67/025 709/224 |
| 8,738,770 B2 * | 5/2014 | Kumarjiguda | ........ | H04L 67/025 709/224 |
| 8,812,694 B2 * | 8/2014 | Kramarenko | ....... | H04L 65/1069 709/228 |

(Continued)

OTHER PUBLICATIONS

Anonymously, "Message flow aggregation", https://www.ibm.com/docs/en/integration-bus/9.0.0?topic=aggregation-message-flow, IBM Documentation, Publication date Mar. 1, 2021, 4 pages.

(Continued)

*Primary Examiner* — Alicia Baturay
(74) *Attorney, Agent, or Firm* — Aaron Pontikos; Andrew D. Wright; Calderon Safran & Wright P.C.

(57) ABSTRACT

A method includes: receiving an initial request message in a request queue of the messaging system; receiving an aggregation reply message in a reply queue of the messaging system, wherein the aggregation reply message is received from an integration system that processes the initial request message, and wherein the aggregation reply message includes an aggregation identifier associated with the initial request message; in response to receiving the aggregation reply message, starting a timeout process; monitoring the timeout process; holding one or more messages that are in the reply queue and that include the aggregation identifier until the timeout process expires or an expected number of responses has been received; and making available the one or more messages that are in the reply queue and that include the aggregation identifier based on the timeout process expiring or the expected number of responses having been received.

20 Claims, 5 Drawing Sheets

(56) References Cited

U.S. PATENT DOCUMENTS

| | | | | |
|---|---|---|---|---|
| 9,942,339 | B1* | 4/2018 | Milyakov | H04L 65/611 |
| 10,447,607 | B2* | 10/2019 | Varadarajan | H04L 47/50 |
| 10,884,832 | B2* | 1/2021 | Dolby | G06F 9/526 |
| 11,734,691 | B2* | 8/2023 | Muthuswamy | H04L 67/566 |
| | | | | 709/224 |
| 11,818,036 | B2 | 11/2023 | Yang et al. | |
| 2020/0310895 | A1 | 10/2020 | Dolby et al. | |
| 2021/0240711 | A1 | 8/2021 | Coleman et al. | |
| 2022/0150204 | A1 | 5/2022 | Madhavan et al. | |
| 2023/0327996 | A1 | 10/2023 | Klenk et al. | |

OTHER PUBLICATIONS

Anonymously, "Time-Based Aggregator Example—Mule 4", https://docs.mulesoft.com/aggregators-module/1.0/aggregators-time-example, MuleSoft Documentation, Accessed Jan. 3, 2024, 6 pages.
Anonymously, "A messaging based implementation for Aggregation", https://priorart.ip.com/IPCOM/000135827, The IP.com Journal, IBM, Publication date Apr. 25, 2006, 9 pages.
Anonymously, "Aggregator", https://docs.spring.io/spring-integration/reference/aggregator.html, Spring Integration, Accessed Jan. 3, 2024, 35 pages.

\* cited by examiner

TIMEOUT PROCESSING FOR AGGREGATION MESSAGING IN AN INTEGRATION ENVIRONMENT

BACKGROUND

Aspects of the present disclosure relate generally to aggregation messaging in an integration environment.

Integration products include a field of software architecture that focuses on system interconnection, electronic data interchange, product data exchange, and distributed computing environments. Such solutions enable multiple systems or applications to integrate with each other in order to exchange data using various communication protocols.

In one example of an integration environment, message flows are used by enterprises to integrate enterprise applications and other applications (e.g., third party applications). An aggregation method, according to one example, comprises generation of a plurality of related requests that are derived from an input message sent by a requesting application and collation of one or more replies to produce an aggregated reply (output) message.

SUMMARY

In a first aspect of the invention, there is a computer-implemented method including: receiving, by a messaging system, an initial request message in a request queue of the messaging system, the initial request message being received from a requesting application; receiving, by the messaging system, an aggregation reply message in a reply queue of the messaging system, wherein the aggregation reply message is received from an integration system that processes the initial request message for the requesting application, and wherein the aggregation reply message includes an aggregation identifier associated with the initial request message; in response to receiving the aggregation reply message, starting, by the messaging system, a timeout process; monitoring, by the messaging system, the timeout process; holding, by the messaging system, one or more messages that are in the reply queue and that include the aggregation identifier until the timeout process expires or an expected number of responses has been received; and making available, by the messaging system, the one or more messages that are in the reply queue and that include the aggregation identifier based on the timeout process expiring or the expected number of responses having been received.

In another aspect of the invention, there is a computer program product including one or more computer readable storage media having program instructions collectively stored on the one or more computer readable storage media. The program instructions are executable to: receive, by a messaging system, an initial request message in a request queue of the messaging system, the initial request message being received from a requesting application, and the messaging system comprising message-oriented middleware between the requesting application and an integration system; receive, by the messaging system, an aggregation reply message in a reply queue of the messaging system, wherein the aggregation reply message is received from the integration system that processes the initial request message for the requesting application, and wherein the aggregation reply message includes an aggregation identifier associated with the initial request message; in response to receiving the aggregation reply message, start, by the messaging system, a timeout process; monitor, by the messaging system, the timeout process; hold, by the messaging system, one or more messages that are in the reply queue and that include the aggregation identifier until the timeout process expires or an expected number of responses has been received; and make available, by the messaging system, the one or more messages that are in the reply queue and that include the aggregation identifier based on the timeout process expiring or the expected number of responses having been received.

In another aspect of the invention, there is a system including a processor set, one or more computer readable storage media, and program instructions collectively stored on the one or more computer readable storage media. The program instructions are executable to: receive, by a messaging system, an initial request message in a request queue of the messaging system, the initial request message being received from a requesting application, and the messaging system comprising message-oriented middleware between the requesting application and an integration system; receive, by the messaging system, an aggregation reply message in a reply queue of the messaging system, wherein the aggregation reply message is received from the integration system that processes the initial request message for the requesting application, and wherein the aggregation reply message includes an aggregation identifier associated with the initial request message; in response to receiving the aggregation reply message, start, by the messaging system, a timeout process; monitor, by the messaging system, the timeout process; hold, by the messaging system, one or more messages that are in the reply queue and that include the aggregation identifier until the timeout process expires or an expected number of responses has been received; and make available, by the messaging system, the one or more messages that are in the reply queue and that include the aggregation identifier based on the timeout process expiring or the expected number of responses having been received.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
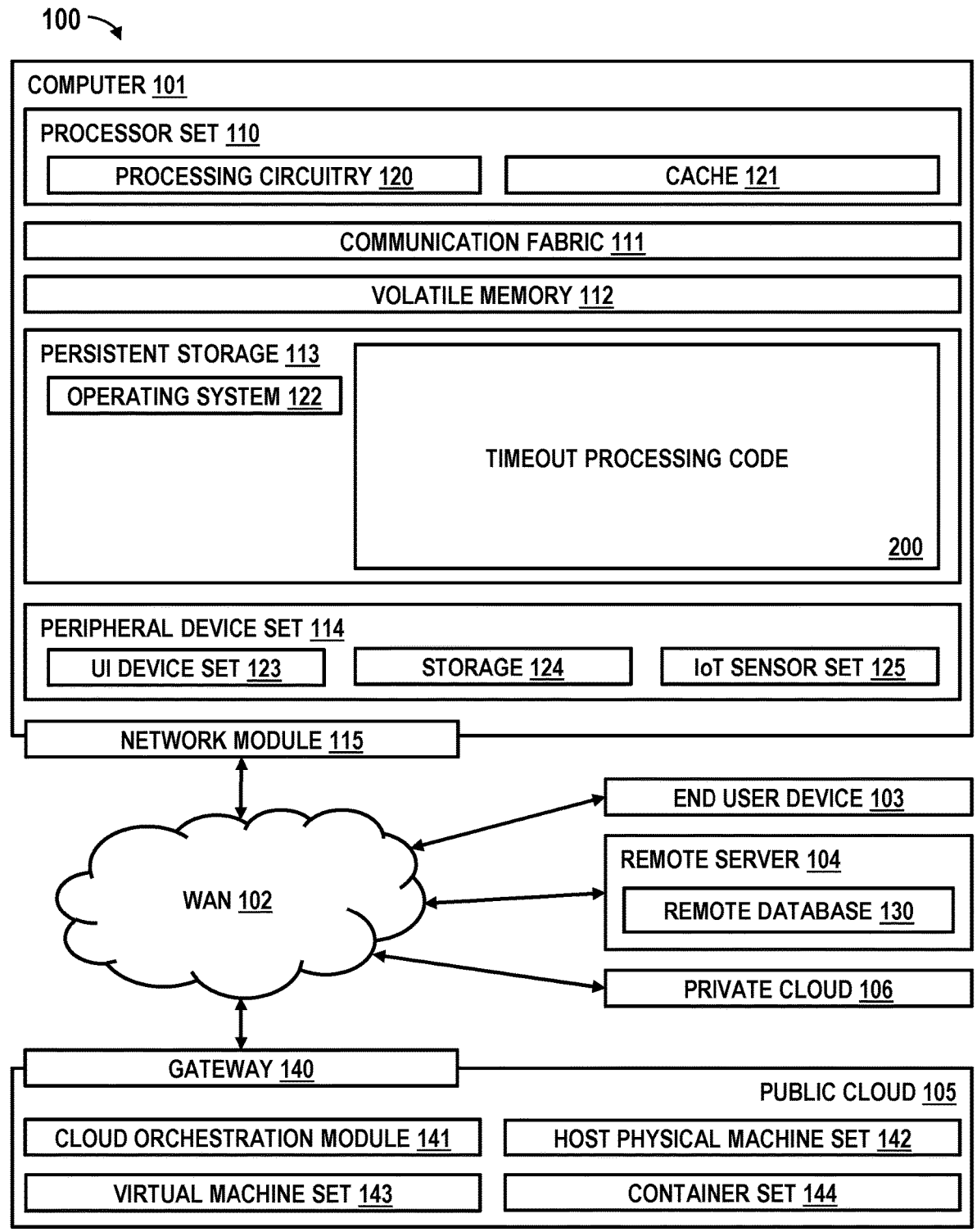
FIG. 1 depicts a computing environment according to an embodiment of the present disclosure.

Aspects of the present disclosure relate generally to aggregation messaging in an integration environment and, more particularly, to timeout processing for aggregation messaging in an integration environment. Various embodiments of the present disclosure provide an inventive method, system, and computer program product for timeout processing of aggregation messaging in an integration environment in which response messages are aggregated at a reply queue, rather than at an intermediate queue, and in which the timeout process and the release of the aggregated response messages is controlled by a messaging system rather than by an integration system. In this manner, implementations of the invention advantageously reduce the computational workload and the time involved in providing the response messages to a requesting application when a timeout occurs.

In an integration environment, message flows are used by enterprises to integrate enterprise applications and other applications (e.g., third party applications). A message flow may include a sequence of processing steps (typically termed nodes) that are operable to be executed when an input message is received. A node is operable to receive a message, perform a set of actions against the message, and optionally, pass the message and/or one or more other messages to the next node in the message flow. An aggregation method, according to one example, comprises generation of a plurality of related requests that are derived from an input message sent by a requesting application and collation of one or more replies to produce an aggregated reply (output) message. Typically, the input message (e.g., comprising one or more related request items) is received into a first message flow and is operable to be split by a first node in the first message flow into a number of individual requests. A second node may be configured to wait for one or more replies from one or more applications to arrive (or time out) and combines the replies into the reply message. The second node may be configured to return the reply message to the requesting application indicating completion of the aggregation method in the first message flow or in a second message flow. Requests and replies can be issued to applications that are logically separate from the integration environment. Advantageously, aggregation can help to improve response time because requests can be executed in parallel and non-sequentially.

Various embodiments provide an optimized timeout processing method for aggregation messaging in an integration environment. In embodiments, as replies are returned to a fan-in message flow, a messaging system transaction is opened and within that transaction they are written to the final output queue destination ready to be read by the receiving client application. In accordance with aspects described herein, the transaction is held open so the receiving client application does not see the messages until the messaging system chooses to commit the aggregation as complete. If aggregation timeout occurs, then the replies which have been received are made available to the initial requesting client. The timeout period for the aggregation is tracked by the message queue provider itself, such that when the timeout is reached, the message queue provider automatically closes the transaction, committing the reply data to the queue. This commit makes the data available to be read from the queue. The separate message replies may also form part of a segmented message group, so that when the client application receives the partially complete set of responses that were returned within the timeout, all of these replies may be delivered as a single large data set, ready for downstream processing. This may involve the message queue provider passing a single data structure in memory even if the contributing data came from discretely stored messages on the queue.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as timeout processing code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
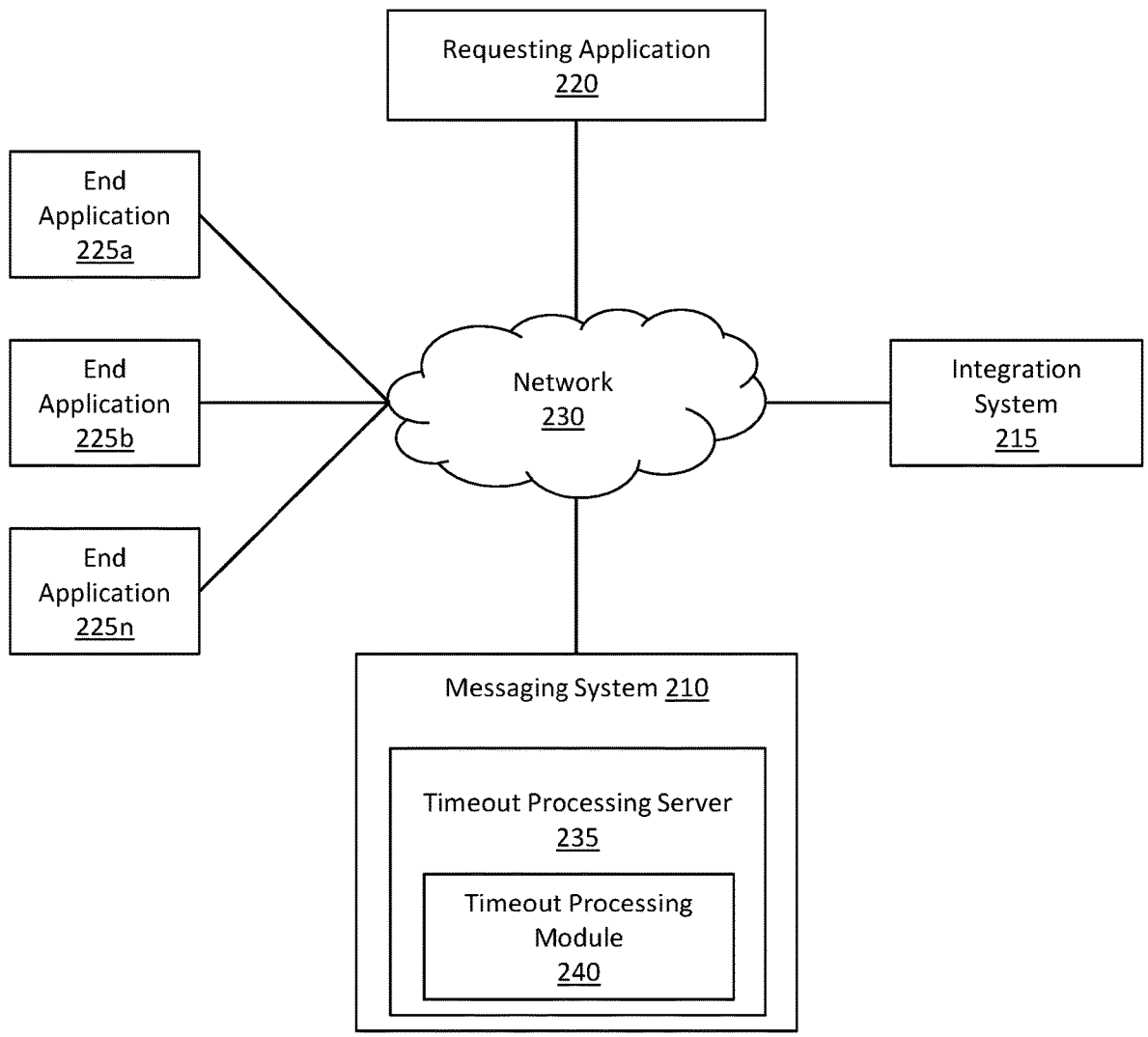
FIG. 2 shows a block diagram of an exemplary environment in accordance with aspects of the present disclosure.

FIG. 2 shows a block diagram of an exemplary environment 205 in accordance with aspects of the invention. In embodiments, the environment 205 includes a messaging system 210, an integration system 215, a requesting application 220, and end applications 225a, 225b, . . . 225n. The messaging system 210 may comprise a message-oriented middleware (MoM) system. MoM is software or hardware infrastructure supporting sending and receiving messages between distributed systems. MoM allows application modules to be distributed over heterogeneous platforms and reduces the complexity of developing applications that span multiple operating systems and network protocols. The middleware creates a distributed communications layer that insulates the application developer from the details of the various operating systems and network interfaces.

The end applications 225a-n comprise any plural number "n" of applications (e.g., software applications) in a distributed computing system and running on any number of servers, virtual machines, or containers, such as remote server 104 of FIG. 1. The requesting application 220 comprises an application (e.g., a software application) running on a user device such as end user device 103 of FIG. 1 or a server, virtual machine, or container, such as remote server 104 of FIG. 1.

With continued reference to FIG. 2, integration system 215 comprises one or more integration applications running on any number of servers, virtual machines, or containers, such as remote server 104 of FIG. 1. In embodiments, the one or more integration applications of the integration system 215 are configured to: receive an input message from the requesting application 220; generate a plurality of requests that are derived from the input message; send respective ones of the plurality of requests to respective ones of the end applications 225a-n; receive respective responses from the end applications 225a-n in response to the requests; and provide the responses to the requesting application 220.

In embodiments, the messaging system 210 provides middleware for message-based communication between the requesting application 220 and the integration system 215 and between the integration system 215 and the end applications 225a-n and. Network 230, which may comprise WAN 102 of FIG. 1, may provide infrastructure for communication between the elements of the environment 205.

In an embodiment, the environment 205 also includes a timeout processing server 235 that runs the code of block 200 of FIG. 1. The timeout processing server 235 may comprise one or more instances of the computer 101 of FIG. 1, or may comprise one or more virtual machines or containers running on one or more instances of the computer 101 of FIG. 1. The timeout processing server 235 may be included in the messaging system 210 or in communication with the messaging system 210. In embodiments, the timeout processing server 235 comprises a timeout processing module 240, which may comprise one or more modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The timeout processing server 235 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
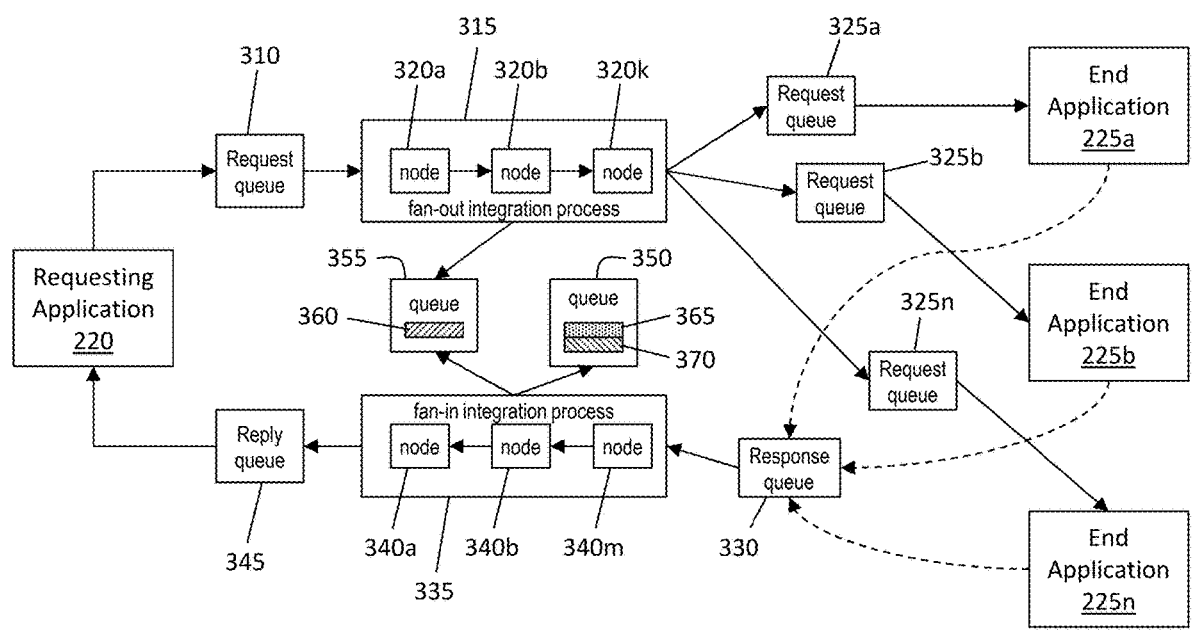
FIG. 3 shows a block diagram of an environment and method for handling aggregation messaging in an integration environment in accordance with aspects of the present disclosure.

FIG. 3 shows a block diagram of an environment and method for handling aggregation messaging in an integration environment in accordance with aspects of the present disclosure. In the example shown in FIG. 3, the requesting application 220 (of FIG. 2) sends an initial request message to a request queue 310 of a messaging system (such as messaging system 210 of FIG. 2). Fan-out integration process 315 of an integration system (such as integration system 215 of FIG. 2) reads the initial request message from the request queue 310 and processes the initial request message using one or more nodes 320a, 320b, . . . , 320k, where "k" can be any integer. In this example, the fan-out integration process 315 comprises a fan-out message flow that includes a sequence of processing steps (i.e., the nodes 320a-k) that are operable to be executed when an input message is received. Each of the nodes 320a-k is operable to receive the initial request message, perform a set of actions against the message, and optionally, pass the message and/or one or more other messages to the next node in the message flow. In this example, the fan-out integration process 315 generates a plurality of individual request messages that are derived from the initial request message and sends the individual request messages to the end applications 225a-n (of FIG. 2) via request queues 325a-n. Ideally, each of the end applications 225a-n generates a response message in response to its respective request message and sends the response message to a response queue 330. Fan-in integration process 335 of the same integration system (i.e., integration system 215 of FIG. 2) reads the response messages from the response queue 330 and processes the response messages using one or more nodes 340a, 340b, . . . , 340m, where "m" can be any integer. In this example, the fan-in integration process 335 comprises a fan-in message flow that saves in an intermediate queue 350 all response messages received from the end applications 225a-n via the response queue 330, examples of which are shown at messages 365 and 370. Also shown in FIG. 3 is intermediate queue 355 that holds an aggregation message 360 placed there by fan-out integration process 315 in response to the fan-out integration process 315 reading the initial request message from the request queue 310.

In the example shown in FIG. 3, the queues 310 and 345 are part of the messaging system such as messaging system 210 of FIG. 2. Queues 325a-n, 330, 350, and 355 may also be part of the same messaging system or may be part of one or more different messaging systems.

In the example shown in FIG. 3, the fan-in integration process 335 keeps track of the number of response messages received from the end applications 225a-n. In this example, the fan-in integration process 335 also starts and maintains a timeout process associated with the initial request message. In one example situation, if the number of response messages received from the end applications 225a-n, and stored in the intermediate queue 350, equals an expected number of responses prior to expiration of the timeout process, then the fan-in integration process 335 reads all the response messages from the intermediate queue 350, collates these response messages into a single aggregated reply message, and writes the single aggregated reply message to a reply queue 345. In another example situation, if the number of response messages received from the end applications 225a-n, and stored in the intermediate queue 350, is less than the expected number of responses when the timeout process expires, then the fan-in integration process 335 reads all the response messages from the intermediate queue 350, collates these response messages into a single aggregated reply message, and writes the writes the single aggregated reply message to a reply queue 345. In both example situations, the response messages are stored in the intermediate queue 350 until they are moved to the reply queue 345 as the single aggregated reply message by the fan-in integration process 335, and the requesting application 220 is able to access the single aggregated reply message in the reply queue 345 immediately when the single aggregated reply message is moved to the reply queue 345 by the fan-in integration process 335.

Still referring to the example shown in FIG. 3, the integration system that includes fan-out integration process 315 and fan-in integration process 335 is responsible for maintaining the state of the back-end requests, which includes storing how many back-end requests have been made and also storing the responses as they are received and while further responses are waited upon. As response messages are returned by the end applications 225a-n, they are written to the intermediate queue 350 in order to make the architecture highly available. In this manner, should the server running the fan-out integration process 315 and fan-in integration process 335 fail during the period that responses are being gathered from the end applications 225a-n, then when the server is restarted by a high availability manager, the current state of the aggregation is not lost as the queued messages can be recovered from the message queue provider that maintains the intermediate queue 350. The architectural approach illustrated in FIG. 3 carries some disadvantages when it comes to timeout processing. When a timeout occurs, all the response messages which have been received and stored in the intermediate queue 350 are amalgamated into a single reply ready for return to the requesting application 220 via the reply queue 345. This is a costly CPU intensive process which inhibits the performance of the aggregation system as a whole. In this kind of architecture, it is advantageous to get the amalgamated reply message back to the requesting application 220 as fast as possible as it is likely the requesting application 220 will be requiring the reply message the instant the timeout occurs.

Still referring to the example shown in FIG. 3, the requesting application 220 will typically specify a timeout period for an aggregation, i.e., associated with the initial request message. Should the timeout period elapse without all the back-end replies having been received, the integration system has a responsibility to send a timeout reply to the requesting application 220 which contains all the available response messages which have been returned in time. This timeout processing requires the fan-in integration process 335 of the integration system to retrieve all the available response messages from the intermediate queue 350 within a transactional unit of work. When the timeout situation occurs, these distinct response messages are retrieved from the intermediate queue 350 as part of another separate transaction so that they can then be combined into an amalgamated timeout response which is returned to the requesting application 220. As noted above, the retrieval of the response messages from the intermediate queue 350 and writing the single aggregated reply message to the reply queue 345 adds CPU computational workload to the integration system. Moreover, because it takes time to retrieve the response messages from the intermediate queue 350 and write the single aggregated reply message to the reply queue 345, and because the amalgamated timeout response must be present in the reply queue 345 the instant the timeout occurs, this requires the fan-in integration process 335 to start performing these processes before the expiration of the timeout period, which disadvantageously reduces the amount of time available to wait for responses from the end applications 225a-n.

Various embodiments of the present disclosure address these issues by providing timeout processing for aggregation messaging in an integration environment in which the response messages are aggregated at the reply queue, rather than at an intermediate queue, and in which the timeout process and the release of the aggregated response messages is controlled by the messaging system rather than by the integration system. In this manner, implementations of the invention provide an improvement in the technology of timeout processing for aggregation messaging in an integration environment by advantageously reducing the computational workload and the time involved in providing the response messages to the requesting application when a timeout occurs.

Figure 4:
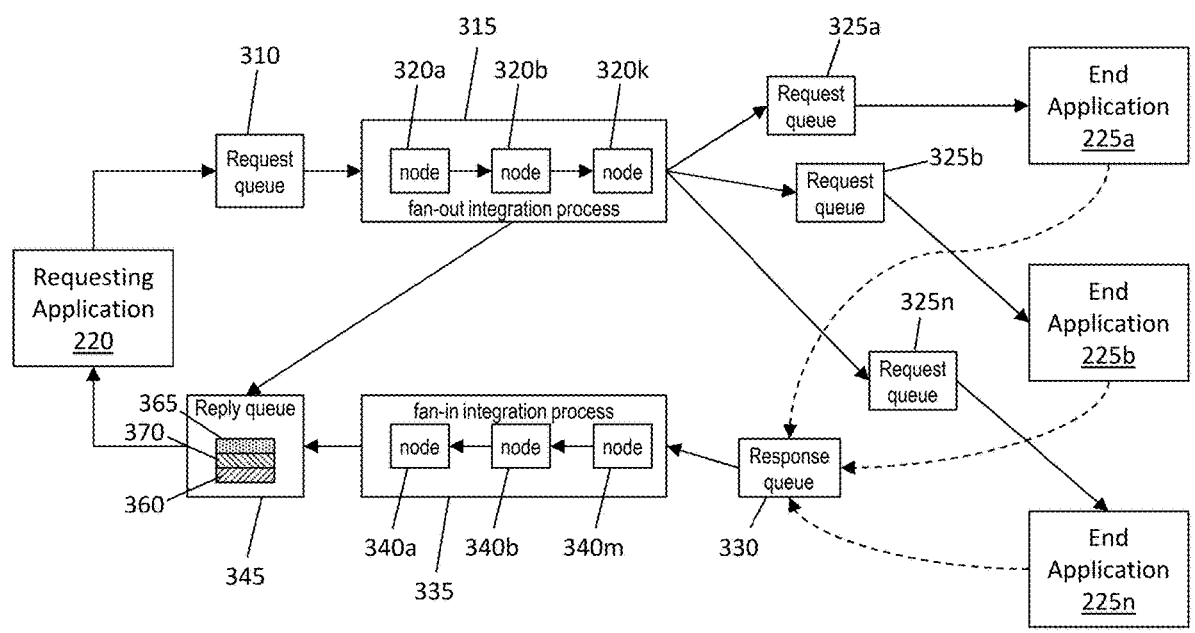
FIG. 4 shows a block diagram of an environment and improved method for handling aggregation messaging in an integration environment in accordance with aspects of the present disclosure.

FIG. 4 shows a block diagram of an environment an improved method for handling aggregation messaging in an integration environment in accordance with aspects of the present disclosure. The environment shown in FIG. 4 matches that of FIG. 3 with the exception of the intermediate queues 350 and 355, and also with the exception of certain tasks performed by the messaging system and the integration system. In various embodiments of the present disclosure, and as illustrated in FIG. 4, as response messages are returned to the fan-in message flow of the fan-in integration process 335, instead of storing these response messages on an internal intermediate processing queue (e.g., such as intermediate queue 350 of FIG. 3), they are written directly to the reply queue 345 in preparation for them being read by the requesting application 220. In embodiments, the operation of the fan-in message flow of the fan-in integration process 335 delivers these response messages using one-phase transactional behaviors, so that multiple instances of the fan-in message flow can be scaled and executed in parallel as required. In embodiments, the response messages that are returned to the fan-in message flow of the fan-in integration process 335 all carry a same aggregation identifier associated with the initial request message, which marks the response messages as being part of a logical conceptual group of messages. In embodiments, the messaging system 210 releases all the response messages from the reply queue 345 as a complete set of data, but only when the aggregation has been completed or the timeout process has expired. In implementations, it is the responsibility of the messaging system 210 to track the timeout process associated with the initial request message. In one embodiment, the messaging system 210 starts the timeout process when the initial message in the group (e.g., an aggregation reply message 360) is passed to the reply queue 345 of the messaging system 210 by the fan-out message flow of the fan-out integration process 315. Should the aggregation timeout period expire before all the response messages have arrived, then the messaging system 210 releases those response messages which have been returned and held in the reply queue 345 so that they can be read from the reply queue by the requesting application.

In various embodiments, the messaging system 210 initiates and monitors the timeout process for the group of delivered response messages that all carry a common identifier referred to herein as an aggregation identifier associated with the initial request message. In these embodiments, the messaging system 210 holds the delivered response messages in the reply queue 345 until the timeout process expires or until the expected number of response messages has been received, at which point the messaging system 210 releases the response messages in the reply queue 345 to the requesting application 220.

In various embodiments, the separate response messages form part of a segmented message group, so that when the requesting application 220 receives the partially complete set of response messages that were returned within the timeout, all of these response messages are delivered as a single large data set that is ready for downstream processing. In one example, the messaging system 210 passes a single data structure in memory (e.g., such as a large JSON or XML structure) even if the contributing data came from discretely stored messages on the queue.

In accordance with aspects of the invention, and with continued reference to FIG. 4, the fan-out message flow of the fan-out integration process 315, upon receipt of the initial request message from the requesting application 220, writes an aggregation reply message 360 to the reply queue 345. In embodiments, the aggregation reply message 360 comprises a zero-response timeout message. In embodiments, the aggregation reply message 360 and any subsequent response messages from the end applications 225a-n (e.g., depicted as messages 365 and 370) all carry a common aggregation identifier which identifies them as members of the same logical in-flight aggregation group associated with the initial request message from the requesting application 220. In embodiments, upon receiving the aggregation reply message 360 in reply queue 345, the timeout processing module 240 (of FIG. 2) starts a timeout process (e.g., a countdown) associated with the initial request message from the requesting application 220. In accordance with aspects of the invention, any response messages that are received before the timeout process expires are written to the reply queue 345 by the fan-in integration process 335 and held in the reply queue 345 by the timeout processing module 240 in a manner that prevents them from being read by the requesting application 220. In accordance with aspects of the invention, when the timeout process expires or when the expected number of response messages has been received, the timeout processing module 240 makes available to the requesting application 220 all the response messages in the aggregation group which have arrived on the reply queue 345. The making available of the response messages comprises releasing the response messages from the reply queue 345 such that they can be read by the requesting application 220. In one example, the timeout processing module 240 holds the response messages in the reply queue using a "get disabled" command and makes the response messages available using a "released" command, although implementations are not limited to this example and other techniques may be used.

Still referring to FIG. 4, there are three situations that may occur when releasing the one or more messages in the reply queue 345 to the requesting application 220. In a first situation, none of the end applications 225*a-n* has replied with a response message when the timeout process expires. In this situation, the aggregation reply message 360 is the only message that is in the reply queue 345 and includes the aggregation identifier. As such, the timeout processing module 240 makes the aggregation reply message 360 available to the requesting application 220 at the expiration of the timeout process.

In a second situation, some but not all of the end applications 225*a-n* have replied with a response message when the timeout process expires. In this situation, response messages from the end applications 225*a-n* are processed by the fan-in integration process 335 and each one is separately written directly to the reply queue 345. The aggregation identifier carried by the response messages logically groups them as related to the initial request message. In this situation, while the response messages are committed to the reply queue 345, the timeout processing module 240 does not release them for reading by the requesting application 220 until the timeout process has expired.

In a third situation, all of the end applications 225*a-n* have replied with a response message before the timeout process expires. In this situation, response messages from the end applications 225*a-n* are processed by the fan-in integration process 335 and each one is separately written directly to the reply queue 345. The aggregation identifier carried by the response messages logically groups them as related to the initial request message. When the number of response messages equals an expected number of responses, the timeout processing module 240 releases them all as an aggregation message group for reading by the requesting application 220

Figure 5:
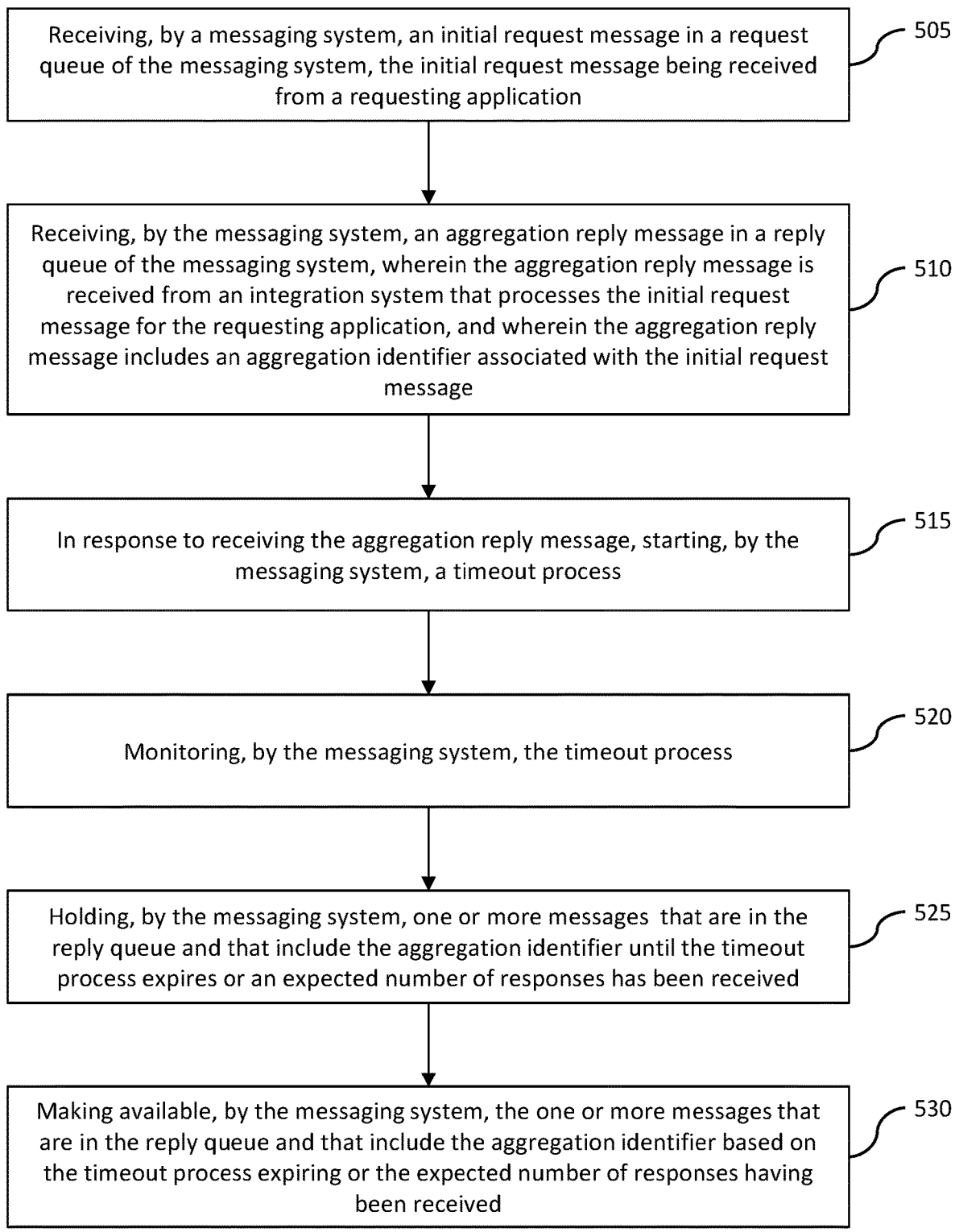
FIG. 5 shows a flowchart of an exemplary method in accordance with aspects of the present disclosure.

FIG. 5 shows a flowchart of an exemplary method in accordance with aspects of the present invention. Steps of the method may be carried out in the environments of FIGS. 2 and 4 and are described with reference to elements depicted in FIGS. 2 and 4.

Block 505 comprises receiving, by a messaging system, an initial request message in a request queue of the messaging system, the initial request message being received from a requesting application. In embodiments, and as described with respect to FIGS. 2 and 4, the messaging system 210 receives the initial request message from the requesting application 220 in the request queue 310.

Block 510 comprises receiving, by the messaging system, an aggregation reply message in a reply queue of the messaging system, wherein the aggregation reply message is received from an integration system that processes the initial request message for the requesting application, and wherein the aggregation reply message includes an aggregation identifier associated with the initial request message. In embodiments, and as described with respect to FIGS. 2 and 4, the messaging system 210 receives the aggregation reply message 360 from fan-out integration process 315 in the reply queue 345.

Block 515 comprises, in response to receiving the aggregation reply message, starting, by the messaging system, a timeout process. In embodiments, and as described with respect to FIGS. 2 and 4, the messaging system 210 starts a timeout process (e.g., countdown) associated with the initial request message upon receipt of the aggregation reply message 260 in the reply queue 345.

Block 520 comprises monitoring, by the messaging system, the timeout process. In embodiments, and as described with respect to FIGS. 2 and 4, the messaging system 210 monitors the timeout process, e.g., by comparing the value of a counter to a timeout value.

Block 525 comprises holding, by the messaging system, one or more messages that are in the reply queue and that include the aggregation identifier until the timeout process expires or an expected number of responses has been received. In embodiments, and as described with respect to FIGS. 2 and 4, the messaging system 210 holds in the reply queue 345 one or more messages that are associated with the initial request message via the aggregation identifier. In one example, the holding prevents the requesting application 220 from reading these messages in the reply queue 345. The one or more messages that are in the reply queue and that include the aggregation identifier may include the aggregation reply message 260 and any response messages received such as response messages 365 and 370.

Block 530 comprises making available, by the messaging system, the one or more messages that are in the reply queue and that include the aggregation identifier based on the timeout process expiring or the expected number of responses having been received. In embodiments, and as described with respect to FIGS. 2 and 4, the messaging system 210 makes available to the requesting application 220 the one or more messages in the reply queue 345 that associated with the initial request message via the aggregation identifier. In one example, the making available permits the requesting application 220 to read these messages in the reply queue 345.

In various embodiments of the method, the initial request message comprises an aggregation request message for aggregating responses from plural end applications such as end applications 225*a-n*.

In various embodiments of the method, the one or more messages that are in the reply queue 345 and that include the aggregation identifier comprise one or more response messages (e.g., response messages 365 and 370) received by the integration system 215 from one or more of the plural end applications 225*a-n* and written by the integration system 215 directly to the reply queue 345.

In various embodiments of the method, the requesting application 220 is prevented from reading the one or more messages that are in the reply queue 345 and that include the aggregation identifier during the holding.

In various embodiments of the method, the requesting application 220 is permitted to read the one or more messages that are in the reply queue 345 and that include the aggregation identifier in response to the making available.

In one example of the method, the one or more messages that are in the reply queue 345 and that include the aggregation identifier comprise the aggregation reply message 360. In this example, based on the timeout process expiring and the reply queue 345 including zero response messages that include the aggregation identifier, the making available comprises releasing the aggregation reply message 360 to the requesting application 220. The aggregation reply message 360 may comprise a zero-response timeout message.

In one example of the method, the one or more messages that are in the reply queue 345 and that include the aggregation identifier comprise one or more response messages (e.g., response messages 365 and 370) that are in the reply queue 345 and that include the aggregation identifier. In this example, based on the timeout process expiring and the one or more response messages being less than the expected number of responses, the making available comprises releasing the one or more response messages to the requesting application 220. The one or more response messages may be released to the requesting application 220 as a single data set.

In one example of the method, the one or more messages that are in the reply queue 345 and that include the aggregation identifier comprise plural response messages (e.g., response messages 365 and 370) that are in the reply queue 345 and that include the aggregation identifier. In this example, based on the plural response messages being equal to the expected number of responses prior to the timeout process expiring, the making available comprises releasing the plural response messages to the requesting application 220 prior to the timeout process expiring. The one or more response messages may be released to the requesting application 220 as a single data set.

In various embodiments of the method, the messaging system 210 comprises message-oriented middleware between the requesting application and the integration system.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, various embodiments of the invention provide a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a messaging system, an initial request message in a request queue of the messaging system, the initial request message being received from a requesting application;
   receiving, by the messaging system, an aggregation reply message in a reply queue of the messaging system, wherein the aggregation reply message is received from an integration system that processes the initial request message for the requesting application, and wherein the aggregation reply message includes an aggregation identifier associated with the initial request message;
   in response to receiving the aggregation reply message, starting, by the messaging system, a timeout process;
   monitoring, by the messaging system, the timeout process;
   holding, by the messaging system, one or more messages that are in the reply queue and that include the aggregation identifier until the timeout process expires or an expected number of responses has been received; and
   making available, by the messaging system, the one or more messages that are in the reply queue and that include the aggregation identifier based on the timeout process expiring or the expected number of responses having been received.

2. The computer-implemented method of claim 1, wherein the initial request message comprises an aggregation request message for aggregating responses from plural end applications.

3. The computer-implemented method of claim 2, wherein the one or more messages that are in the reply queue and that include the aggregation identifier comprise one or more response messages received by the integration system from one or more of the plural end applications and written by the integration system directly to the reply queue.

4. The computer-implemented method of claim 1, wherein the requesting application is prevented from reading the one or more messages that are in the reply queue and that include the aggregation identifier during the holding.

5. The computer-implemented method of claim 1, wherein the requesting application is permitted to read the one or more messages that are in the reply queue and that include the aggregation identifier in response to the making available.

6. The computer-implemented method of claim 1, wherein:
   the one or more messages that are in the reply queue and that include the aggregation identifier comprise the aggregation reply message; and
   based on the timeout process expiring and the reply queue including zero response messages that include the aggregation identifier, the making available comprises releasing the aggregation reply message to the requesting application.

7. The computer-implemented method of claim 6, wherein the aggregation reply message comprises a zero-response timeout message.

8. The computer-implemented method of claim 1, wherein:
   the one or more messages that are in the reply queue and that include the aggregation identifier comprise one or more response messages that are in the reply queue and that include the aggregation identifier; and based on the timeout process expiring and the one or more response messages being less than the expected number of responses, the making available comprises releasing the one or more response messages to the requesting application.

9. The computer-implemented method of claim 8, wherein the one or more response messages are released to the requesting application as a single data set.

10. The computer-implemented method of claim 1, wherein:
the one or more messages that are in the reply queue and that include the aggregation identifier comprise plural response messages that are in the reply queue and that include the aggregation identifier; and
based on the plural response messages being equal to the expected number of responses prior to the timeout process expiring, the making available comprises releasing the plural response messages to the requesting application prior to the timeout process expiring.

11. The computer-implemented method of claim 10, wherein the plural response messages are released to the requesting application as a single data set.

12. The computer-implemented method of claim 1, wherein the messaging system comprises message-oriented middleware between the requesting application and the integration system.

13. A computer program product comprising one or more computer readable storage media having program instructions collectively stored on the one or more computer readable storage media, the program instructions executable to:
receive, by a messaging system, an initial request message in a request queue of the messaging system, the initial request message being received from a requesting application, and the messaging system comprising message-oriented middleware between the requesting application and an integration system;
receive, by the messaging system, an aggregation reply message in a reply queue of the messaging system, wherein the aggregation reply message is received from the integration system that processes the initial request message for the requesting application, and wherein the aggregation reply message includes an aggregation identifier associated with the initial request message;
in response to receiving the aggregation reply message, start, by the messaging system, a timeout process;
monitor, by the messaging system, the timeout process;
hold, by the messaging system, one or more messages that are in the reply queue and that include the aggregation identifier until the timeout process expires or an expected number of responses has been received; and
make available, by the messaging system, the one or more messages that are in the reply queue and that include the aggregation identifier based on the timeout process expiring or the expected number of responses having been received.

14. The computer program product of claim 13, wherein:
the initial request message comprises an aggregation request message for aggregating responses from plural end applications; and
the one or more messages that are in the reply queue and that include the aggregation identifier comprise one or more response messages received by the integration system from one or more of the plural end applications and written by the integration system directly to the reply queue.

15. The computer program product of claim 13, wherein the requesting application is prevented from reading the one or more messages that are in the reply queue and that include the aggregation identifier during the holding.

16. The computer program product of claim 13, wherein the requesting application is permitted to read the one or more messages that are in the reply queue and that include the aggregation identifier in response to the making available.

17. A system comprising:
a processor set, one or more computer readable storage media, and program instructions collectively stored on the one or more computer readable storage media, the program instructions executable to:
receive, by a messaging system, an initial request message in a request queue of the messaging system, the initial request message being received from a requesting application, and the messaging system comprising message-oriented middleware between the requesting application and an integration system;
receive, by the messaging system, an aggregation reply message in a reply queue of the messaging system, wherein the aggregation reply message is received from the integration system that processes the initial request message for the requesting application, and wherein the aggregation reply message includes an aggregation identifier associated with the initial request message;
in response to receiving the aggregation reply message, start, by the messaging system, a timeout process;
monitor, by the messaging system, the timeout process;
hold, by the messaging system, one or more messages that are in the reply queue and that include the aggregation identifier until the timeout process expires or an expected number of responses has been received; and
make available, by the messaging system, the one or more messages that are in the reply queue and that include the aggregation identifier based on the timeout process expiring or the expected number of responses having been received.

18. The system of claim 17, wherein:
the initial request message comprises an aggregation request message for aggregating responses from plural end applications; and
the one or more messages that are in the reply queue and that include the aggregation identifier comprise one or more response messages received by the integration system from one or more of the plural end applications and written by the integration system directly to the reply queue.

19. The system of claim 17, wherein the requesting application is prevented from reading the one or more messages that are in the reply queue and that include the aggregation identifier during the holding.

20. The system of claim 17, wherein the requesting application is permitted to read the one or more messages that are in the reply queue and that include the aggregation identifier in response to the making available.

* * * * *